Aug. 25, 1970     M. A. CROSBY     3,525,136

CLAMPING ARRANGEMENT

Filed May 15, 1968     2 Sheets-Sheet 1

INVENTOR.
MELVIN A. CROSBY

Aug. 25, 1970     M. A. CROSBY     3,525,136
CLAMPING ARRANGEMENT
Filed May 15, 1968     2 Sheets-Sheet 2
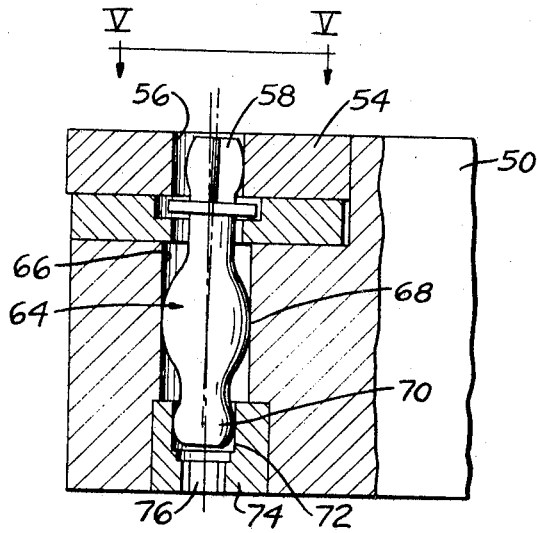
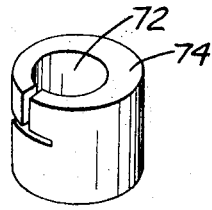
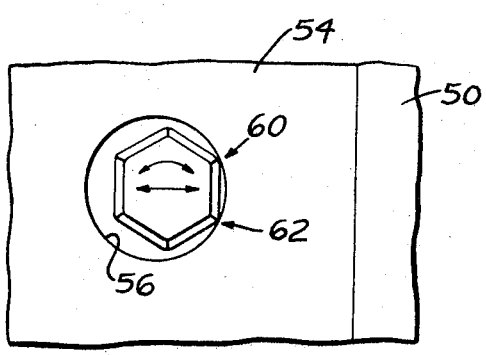
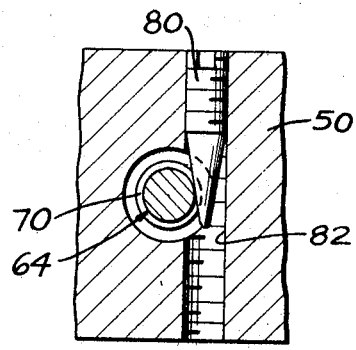
INVENTOR.
MELVIN A. CROSBY United States Patent Office 3,525,136
Patented Aug. 25, 1970

3,525,136
CLAMPING ARRANGEMENT
Melvin A. Crosby, Latrobe, Pa., assignor to Kennametal Inc., Latrobe, Pa., a corporation of Pennsylvania
Filed May 15, 1968, Ser. No. 729,362
Int. Cl. B26d 1/00
U.S. Cl. 29—96
8 Claims

ABSTRACT OF THE DISCLOSURE

The device comprises a holder having a pocket with a bottom wall and one or more side walls perpendicular to the bottom wall and a cutting insert with a hole therein resting on the bottom wall of the pocket. A pin is tiltable in the holder and has an end portion projecting through the bottom wall of the pocket and with the hole in the insert and means are provided on the holder to tilt the pin to cause the insert to be forced against the side wall, or walls, of the pocket.

The present invention provides for the end portion of the pin to be non-circular so as to engage the periphery of the hole in the insert at spaced points about the hole.

This invention relates to clamping devices for cutting inserts for clamping them in place in tool holders.

Devices for clamping cutting inserts in notches provided therefor in tool holders are known and can take several forms. The earliest manner of clamping cutting inserts in tool holders was by way of a top clamp which merely pressed down on top of the insert and clamped it against the bottom of the recess. In other cases, a hole is provided in the insert and a screw extending through the hole is threaded into the holder and clamps the insert in place. In one type of holder the insert is provided with a hole and a rotatable pin is mounted in a bore in the tool holder and has an eccentric extension which is received in the hole in the insert so that when the pin is rotated the extension will force the insert against the back of the notch provided therefor in the holder. In still another form of clamping device, a tiltable lever is mounted in a bore in the tool holder and has an end part received in a hole in the insert and a cam is provided for tilting the lever in the bore so that the end thereof in the hole in the insert will force the insert back against the wall of the notch in the holder.

Each of the clamping arrangements referred to above has certain defects. In the case of the simple top clamp, it sometimes occurs that the clamping arrangement is too bulky and some difficulty can be experienced in getting the insert located exactly properly on the holder.

In the case of the insert provided with the central hole which receives the screw to clamp the insert in place, some difficulty can be experienced in forming the hole which is usually shouldered or chamfered for receiving the head of the clamping screw. Since inserts are ordinarily made of cemented carbide, it will be apparent that the hole must be molded into the insert because of the extreme difficulty of performing machining operations on such an insert after it has been completely manufactured.

In the case of the rotatable pin having the cylindrical eccentric extension, the hole in the insert is round and the extension is also round and this provides for merely a line contact between the inside of the hole and the insert in the outer periphery of the extension. Since, in order to lock the insert in place, it is necessary for the cylindrical extension to come close to passing over center when it is rotated into locking position, the pressures developed on the cylindrical extension are high and it tends to wear off and considerable difficulty can be encountered in respect of accurately locating the insert in its notch.

With respect to the tiltable lever arrangement, substantially a point contact exists between the lever and the insert and this also can lead to extremely high pressures being developed between the lever and the insert.

In respect of the arrangement wherein an eccentric cylindrical projection on a rotatable pin, or the end of a lever, projects into a hole in the insert, it has been proposed to form the hole in the insert so that it is polygonal in cross section whereby the eccentric projection of the pin, or the end of the lever, will engage the hole in the insert at two angularly spaced points. This arrangement has the benefit of providing for more accurate location of the insert and also establishes conditions such that the clamping device will hold the insert securely against forces extending laterally to the wall of the notch in which the insert is mounted but has the disadvantage that the region of the insert between the points of engagement is placed in tension and may fracture under certain conditions.

Having the foregoing in mind, it is an object of the present invention to provide an improved insert clamping arrangement utilizing either a tilting lever or a rotating pin as the locking instrumentality in which the drawbacks referred to above are eliminated.

A further object of the present invention is a provision of a simple insert locking device for locking the insert in a notch in a tool holder in which the insert is accurately located in the notch and is firmly held therein but is not subjected to any forces that might tend to fracture the insert in use.

Still a further object of this invention is the provision of a device for locking an insert to a holder which is adapted to substantially any type insert and holder while still realizing all the benefits of the arrangement.

The objects referred to above as well as still other objects and advantages of the present invention will become more apparent upon reference to the following detailed specification taken in connection with the accompanying drawings in which:

FIG. 4 is a vertical sectional view indicated by line IV—IV on FIG. 3;

FIG. 5 is a fragmentary plan view indicated by line V—V on FIG. 4;

FIG. 6 is a perspective view showing an eccentric cup forming a part of the FIG. 4 construction;

FIG. 7 is a fragmentary plan section showing a different cam arrangement that can be employed with a tiltable lever of FIG. 4;

Figure 1:
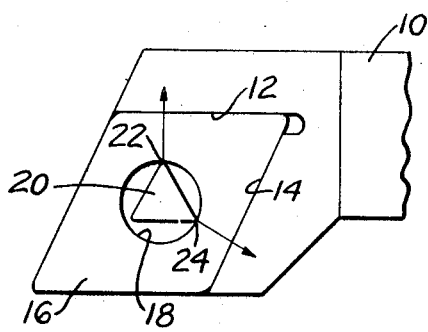
FIG. 1 is a fragmentary plan view showing a holder and a diamond shaped insert mounted therein and held in place with a locking device according to the present invention.

Referring to the drawing somewhat more in detail, in FIG. 1 the tool holder or shank is indicated at 10 and, at one end, it is provided with a pocket bounded by the angularly related walls 12 and 14. In this pocket is disposed a diamond-shaped cutting insert 16 which may consist of, for example, a cemented tungsten carbide or a cemented titanium carbide or some other like composition. The insert is provided with a central hole 18 and extending into the hole 18 is an element 20 which is operable for forcing the insert against walls 12 and 14 of the pocket. The element 20 is carried in shank 10 and is either tiltable toward and away from walls 12 and 14 or can take an orbital path with respect thereto so as to engage the periphery of hole 18 in the insert and force it toward walls 12 and 14. As shown in FIG. 1 the end of element 20 disposed in hole 18 is triangular so that the periphery of hole 18 is engaged at the two spaced points 22 and 24, thus developing clamping thrust on the insert directed substantially perpendicularly toward walls 12 and 14 thereby to insure perfect clamping of the insert in the pocket. As will be seen hereinafter, the portion of the clamping device that extends into hole 18 is rotatable relative to the remainder of the clamping device so that the points of engagement 22 and 24 will always be substantially in the position illustrated in FIG. 1.

Figure 2:
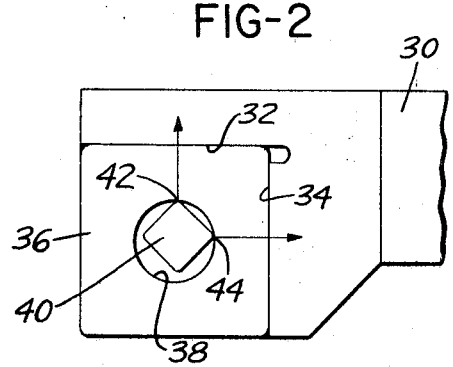
FIG. 2 is a view like FIG. 1 but shows a square insert.

In FIG. 2, the holder is indicated at 30 and it has a pocket therein having walls 32 and 34. Square insert 36 is mounted in the pocket and has a central hole 38 into which element 40 extends which is square in cross section so as to engage the insert at the points 42 and 44.

Figure 3:
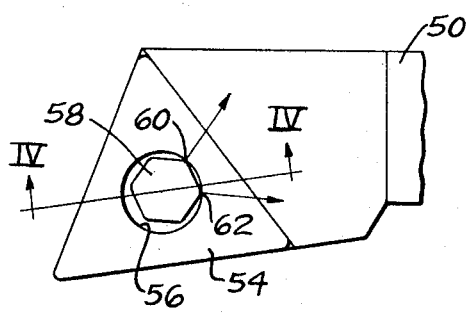
FIG. 3 is a view like FIGS. 1 and 2 but shows a triangular insert and also shows a notch or pocket for the insert having only a single wall.

In FIG. 3, the holder or shank is indicated at 50 and it has a notch or pocket therein having a single wall 52. Mounted in the notch or pocket is an insert 54 which may be any shape, but which, for the sake of illustration, is shown as triangular. Insert 54 has a central hole 56 into which element 58 extends. Element 58 is polygonal in cross section and may, for example, be hexagonal and engages the insert about the periphery of hole 56 at points 60 and 62.

Turning now to FIG. 4, it will be seen that element 58 is the upper end of a lever 64 that is disposed in a bore 66 in holder 50. The lever 64 has an intermediate region 68 closely fitted in bore 66 so that the lever is tiltable about the largest diameter region of portion 68. The lower end of 64 at 70 is received in eccentric bore 72 in a cup 74. Cup 74 has means at 76, such as, a hexagonal hole, for receiving a turning tool so that the cup can be rotated in the holder.

Since the socket 72 in the cup is eccentric, it will be apparent that rotation of the cup in the holder will cause tilting movement of lever 64. It will also be evident that the lever can rotate relative to the cup so as to assume the proper angular position to provide for the points of contact, 60 and 62 as identified in FIG. 3 and further identified by the same reference numerals in FIG. 5.

Since the element 58 at the upper end of lever 64 approaches wall 52 of the pocket of the holder, it follows that the lever will adjust itself angularly to provide for the two points of contact referred to and indicated at 60 and 62 in FIGS. 3 and 5. It will be appreciated that much better locating of the insert along the length of wall 52 and much better clamping of the insert to the wall will be obtained in this manner because each of points 60 and 62 is located at a region of the periphery of hole 36 that extends at a substantial angle to the wall 52. This is in distinct contrast to the conditions that would obtain if element 58 were round in cross section in which case it would engage the inner periphery of hole 56 with line contact only and, furthermore, the point of engagement of the element 58 with the hole if element 58 were circular would be along a region of hole 56 having only a slight angularity with respect to wall 52. The difficulty of locating the insert along wall 52 and the difficulty of holding it against thrusts exerted on the insert in the direction of wall 52 will be apparent.

In FIG. 4, a cup 74, shown in perspective in FIG. 6, is employed for actuating lever 64. When cup 74 is rotated, the element 58 at the upper end of the lever will take an orbital path. However, the lever arrangement disclosed in FIG. 4 is also adapted for operation by other camming instrumentalities, such as the cone pointed screw 80 shown in FIG. 7. Cone pointed screw 80 is threaded into threaded bore 82 in holder 50 and engages the lower end 70 of lever 64 and will thus cause the lever to tilt in bore 66. It will be evident that cone pointed screw 80 can be positioned at any desired angle so that the lever 64 can be tilted in any plane.

In the FIG. 3 modification, the lever could be tilted straight back toward wall 52 whereas in the FIGS. 1 and 2 modifications the lever could be tilted in a direction toward the juncture of the two walls forming a pocket. Other camming devices will suggest themselves to those skilled in the art.

In any case, however, the portion of the clamping device that extends into the hole in the insert is rotatable so as to find its own position when the insert is clamped in the holder thereby insuring the two spaced points of engagement of the element with the insert that produce the accurate locating of the insert and the firm clamping thereof and the support thereof against forces that might tend to move the insert in the pocket. This last mentioned feature is particularly important in respect of pockets having a single straight confining wall as shown in FIG. 3.

Figure 9:
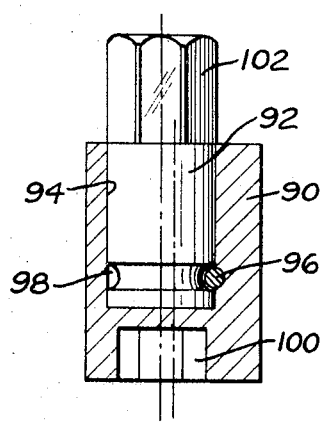
FIG. 9 is a sectional view showing how the present invention might be adapted to a locking arrangement consisting of a rotating pin with an eccentric projection extending axially therefrom.

It has been mentioned that the invention can be availed of for insert clamping or locking devices having a rotatable pin with an eccentric projection thereon. This is illustrated in FIG. 9 wherein the pin body is indicated at 90 and has a cylindrical member 92 disposed rotatably in an eccentric bore 94. A pin 96 loosely engages a groove 98 in member 92 so that member 92 is rotatably held in bore 94. Means such as the hexagonal socket 100 is provided for rotating the pin in the bore provided therefor in the shank of the holder. The upper end of the pin 92 is hexagonal in cross section as shown at 102 so that it will engage the circular hole in an insert at two spaced points and will also find its own angular location in the hole when the insert is locked by rotation of the pin.

Figure 8:
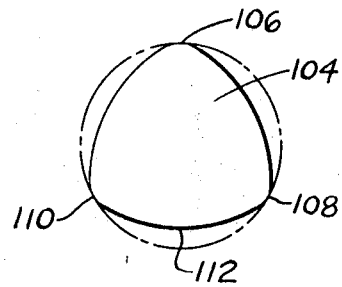
FIG. 8 is a plan view showing the upper end of the lever of the FIG. 1 construction as it might be arranged to provide for the greatest strength of the lever.

FIG. 8 shows how the hole engaging portion of a pin or lever could be formed so that the member has the greatest possible strength. In FIG. 8 the element 104 is provided with the three peaks 106, 108 and 110 forming the regions which engage the inside of the hole in the insert. Between the said peaks the element is formed convex as indicated at 112 so that the least possible strength is lost from the element. The arrangement of FIG. 8 shows a triangular hole engaging member such as is shown at 20 in FIG. 1 and will be apparent that any of the hole engaging elements could be formed in this manner.

It will also be apparent that the hole engaging element could be grooved or the like to provide for spaced points of engagement thereof with a circular hole in an element to be clamped up thereby.

In every case, the important thing is that the clamping device consists of a portion receivable in a circular hole in an insert, said portion having circumferentially spaced regions for engagement with the hole and the insert and being rotatable relative to the actuating means by which the locking and unlocking of the insert is effective.

It will be understood that the present invention is susceptible to modification to adapt it to various usages and accordingly such modifications as fall within the purview of the appended claims are considered to be comprehended within the present invention.

What is claimed is:

1. In a clamping arrangement for clamping a cutting insert having a hole therein in a pocket provided therefor in a holder and which pocket has at least one lateral wall, a clamping device for the insert comprising a first member in a bore in the holder and having one end part extending into the pocket and receivable in the hole in the insert and a second member movable in the holder and operable to actuate said first member to move said one end part thereof in a direction to force the insert against the wall of the pocket, said one end part of said first member when viewed in transverse cross section having circumferentially spaced regions disposed radially outwardly from the remainder of said one end part so the said one end part will engage the hole in the insert at circumferentially spaced points about the said hole, and said first member being rotatable with respect to the axis of said one end part thereof independently of said second member.

2. A clamping arrangement according to claim 1 in which said one end part is polygonal in transverse cross section.

3. A clamping arrangement according to claim 1 in which said first member is in the form of a lever tiltable in the bore in the holder and the outer surface of said one end part of said first member convex outwardly in longitudinal cross section.

4. A clamping arrangement according to claim 1 in which said one end part is convex outwardly in lateral cross section between said spaced regions.

5. A clamping arrangement according to claim 3 in which said lever has an intermediate portion closely fitting the bore in the holder, and cam means movable in said holder and engaging the lever on the other end thereof on the opposite side of said intermediate portion from said one end part of said member.

6. A clamping arrangement according to claim 5 in which said cam means is in the form of a cup rotatable in the bore in the holder and having an eccentric socket in which the said other end of said lever is received.

7. A clamping arrangement according to claim 5 in which said cam means is in the form of a wedge element movable in the holder and engaging one side of the said other end of said one member.

8. A clamping arrangement according to claim 1 in which said pocket has two angularly related walls against which said insert is to be forced and said spaced regions of said one end part of said first member are located so the respective lines of action thereof when clampingly engaging said insert pass through respective ones of said walls at a steep angle thereto.

References Cited

UNITED STATES PATENTS

| | | | |
|---|---|---|---|
| 2,240,404 | 4/1941 | King | 29—96 X |
| 3,299,489 | 1/1967 | Pohle | 29—96 |
| 3,341,921 | 9/1967 | Weller et al. | 29—96 |

FOREIGN PATENTS 1,347,086   11/1963   France.

HARRISON L. HINSON, Primary Examiner